(12) United States Patent
Satoh et al.

(10) Patent No.: US 6,597,815 B1
(45) Date of Patent: Jul. 22, 2003

(54) IMAGE DATA COMPRESSION APPARATUS AND METHOD THEREOF

(75) Inventors: Hitoshi Satoh, Atsugi (JP); Satoshi Tanaka, Zama (JP); Kazuhiro Gotoh, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/419,472

(22) Filed: Oct. 15, 1999

(30) Foreign Application Priority Data

Oct. 19, 1998 (JP) ............................................. 10-296639

(51) Int. Cl.[7] ................................................. G06K 9/38
(52) U.S. Cl. ........................................ 382/251; 382/250
(58) Field of Search ................................. 382/251, 233, 382/235, 239, 253, 250, 56, 248; 375/240.03, 240.04; 358/133, 458

(56) References Cited

U.S. PATENT DOCUMENTS

| | | | |
|---|---|---|---|
| 5,073,821 A | * 12/1991 | Juri ............................. 358/133 |
| 5,146,324 A | * 9/1992 | Miller et al. ................. 358/133 |
| 5,260,808 A | * 11/1993 | Fujii ............................ 358/458 |
| 5,287,420 A | * 2/1994 | Barrett ......................... 382/56 |
| 5,612,788 A | * 3/1997 | Stone ........................... 386/85 |
| 5,684,714 A | * 11/1997 | Yogeshwar et al. .......... 370/521 |
| 5,712,681 A | * 1/1998 | Suh ............................. 348/231.6 |
| 5,819,004 A | * 10/1998 | Azadegan et al. ........... 386/112 |
| 5,850,484 A | * 12/1998 | Beretta et al. ............... 382/250 |
| 5,930,398 A | * 7/1999 | Watney ........................ 382/239 |
| 5,956,431 A | * 9/1999 | Iourcha et al. .............. 382/253 |
| 6,005,982 A | * 12/1999 | Abe ............................. 382/251 |
| 6,298,166 B1 | * 10/2001 | Ratnakar et al. ............ 382/248 |
| 6,330,369 B1 | * 12/2001 | Cornog et al. ............... 382/251 |

FOREIGN PATENT DOCUMENTS

JP 1318730 12/1989

* cited by examiner

Primary Examiner—Jon Chang
Assistant Examiner—Brian Le
(74) Attorney, Agent, or Firm—Louis P. Herzberg

(57) ABSTRACT

This invention makes it possible for a user to know the characteristics of a quantization table used for image compression. An apparatus and method are provided wherein image data compression software displays the compressed image data (expanded image data) according to the JPEG method expanded by a JPEG expansion unit on a display unit 20 through an image display IF 18. Moreover, the image data compression software 5 reflects all values of n×n quantization levels included in a quantization table (first quantization table) supplied from a block decoding section used to generate input JPEG data and displays quantization index value to be indexed (first quantization index value before changed) on the display unit 20.

10 Claims, 11 Drawing Sheets

[Figure 1]
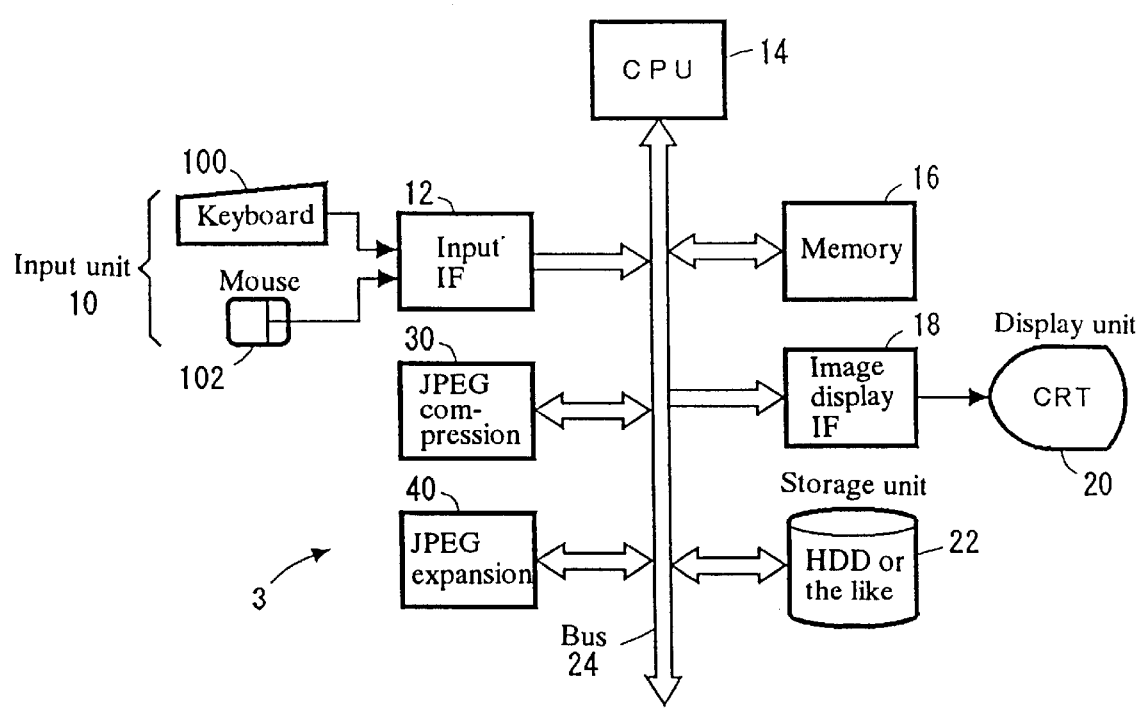

[Figure 2]
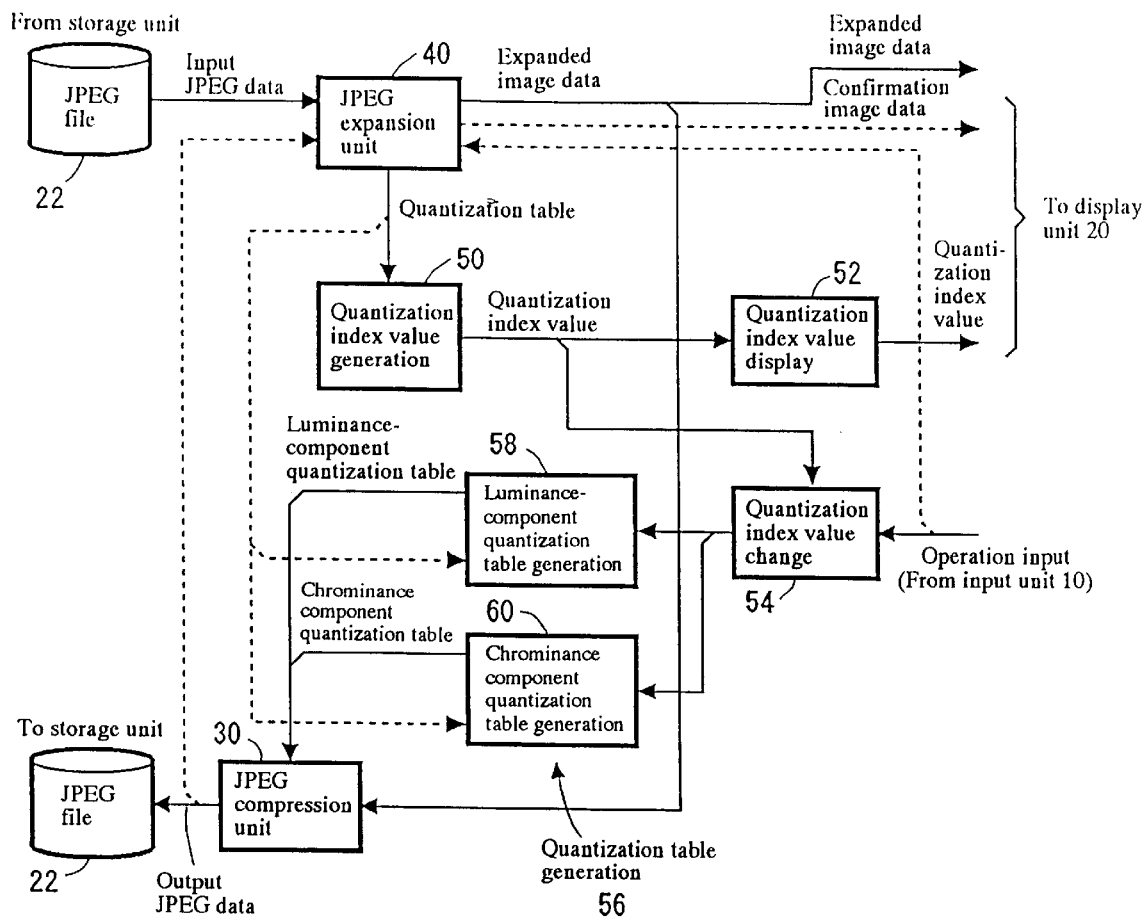

[Figure 3]
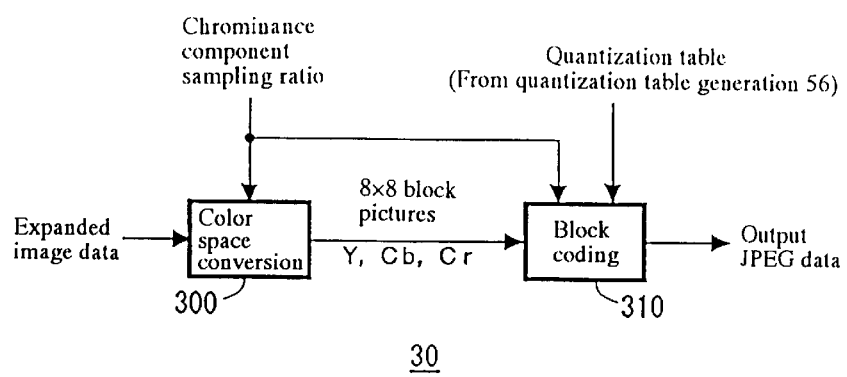
[Figure 4]
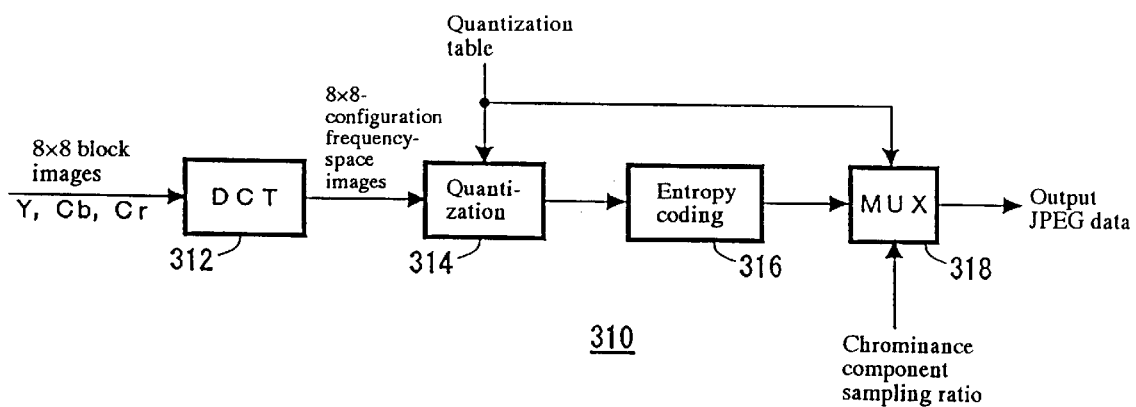

[Figure 5]
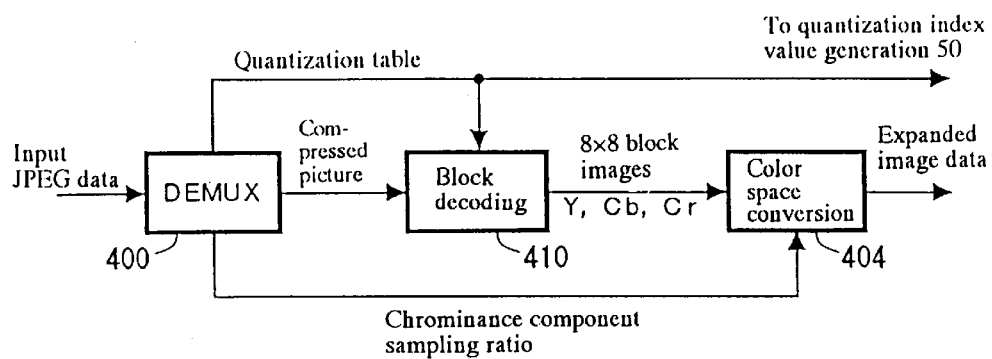
[Figure 6]
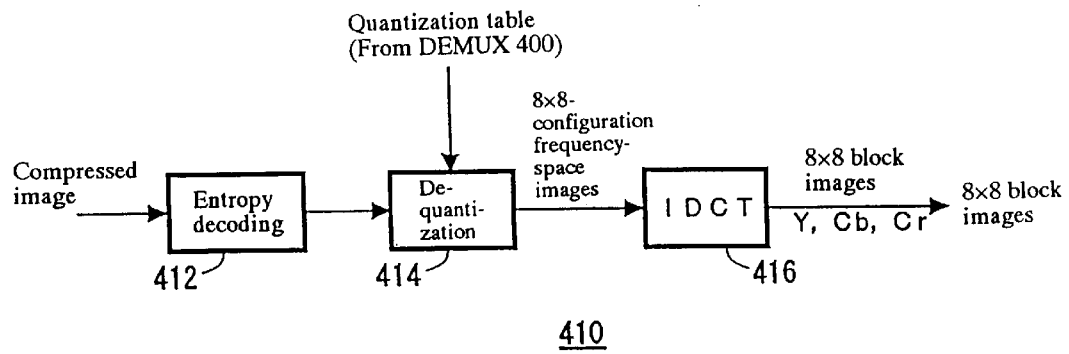

[Figure 7]

Standard Quantization Table for Luminance Component (A)
```
16,  11,  10,  16,  24,  40,  51,  61,
12,  12,  14,  19,  26,  58,  60,  55,
14,  13,  16,  24,  40,  57,  69,  56,
14,  17,  22,  29,  51,  87,  80,  62,
18,  22,  37,  56,  68, 109, 103,  77,
24,  35,  55,  64,  81, 104, 113,  92,
49,  64,  78,  87, 103, 121, 120, 101,
72,  92,  95,  98, 112, 100, 103,  99,
```

Standard Quantization Table for Color-difference Component (B)
```
17,  18,  24,  47,  99,  99,  99,  99,
18,  21,  26,  66,  99,  99,  99,  99,
24,  26,  56,  99,  99,  99,  99,  99,
47,  66,  99,  99,  99,  99,  99,  99,
99,  99,  99,  99,  99,  99,  99,  99,
99,  99,  99,  99,  99,  99,  99,  99,
99,  99,  99,  99,  99,  99,  99,  99,
99,  99,  99,  99,  99,  99,  99,  99,
```

[Figure 12]

Weighting Table

```
2, 2, 2, 2, 1, 1, 1, 1,
2, 2, 2, 2, 1, 1, 1, 1,
2, 2, 2, 2, 1, 1, 1, 1,
2, 2, 2, 2, 1, 1, 1, 1,
1, 1, 1, 1, 1, 1, 1, 1,
1, 1, 1, 1, 1, 1, 1, 1,
1, 1, 1, 1, 1, 1, 1, 1,
1, 1, 1, 1, 1, 1, 1, 1,
```

[Figure 8]
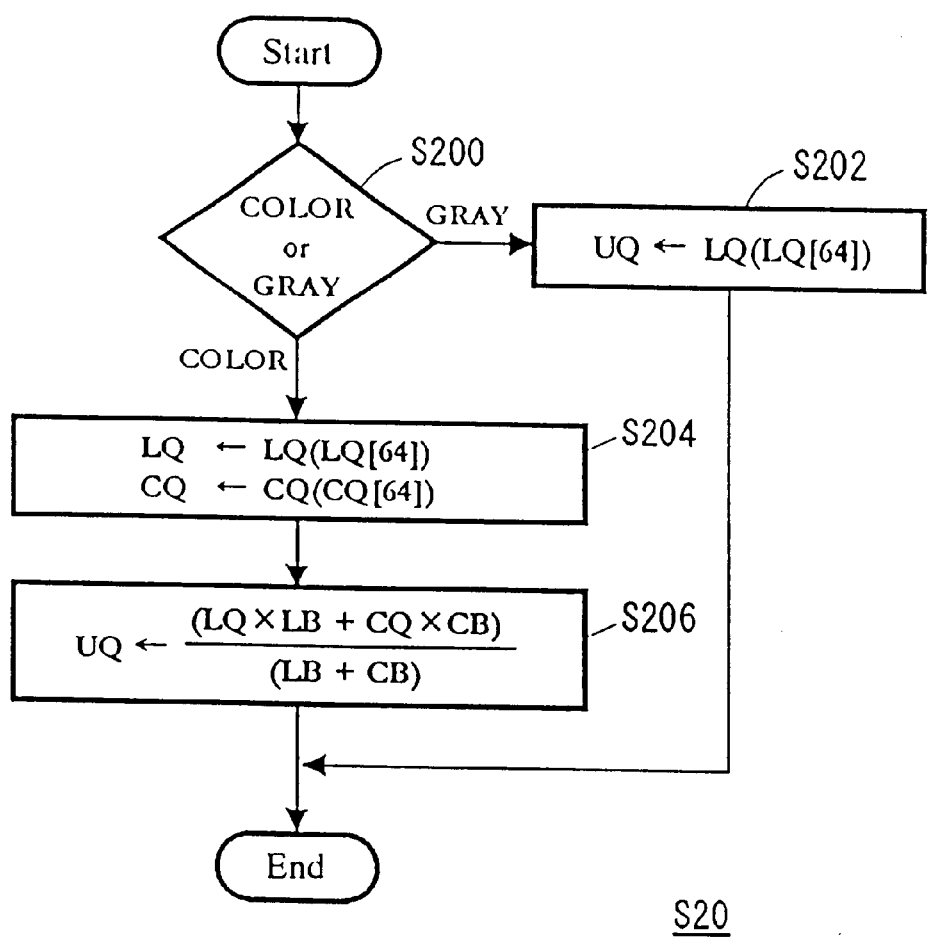

[Figure 9]
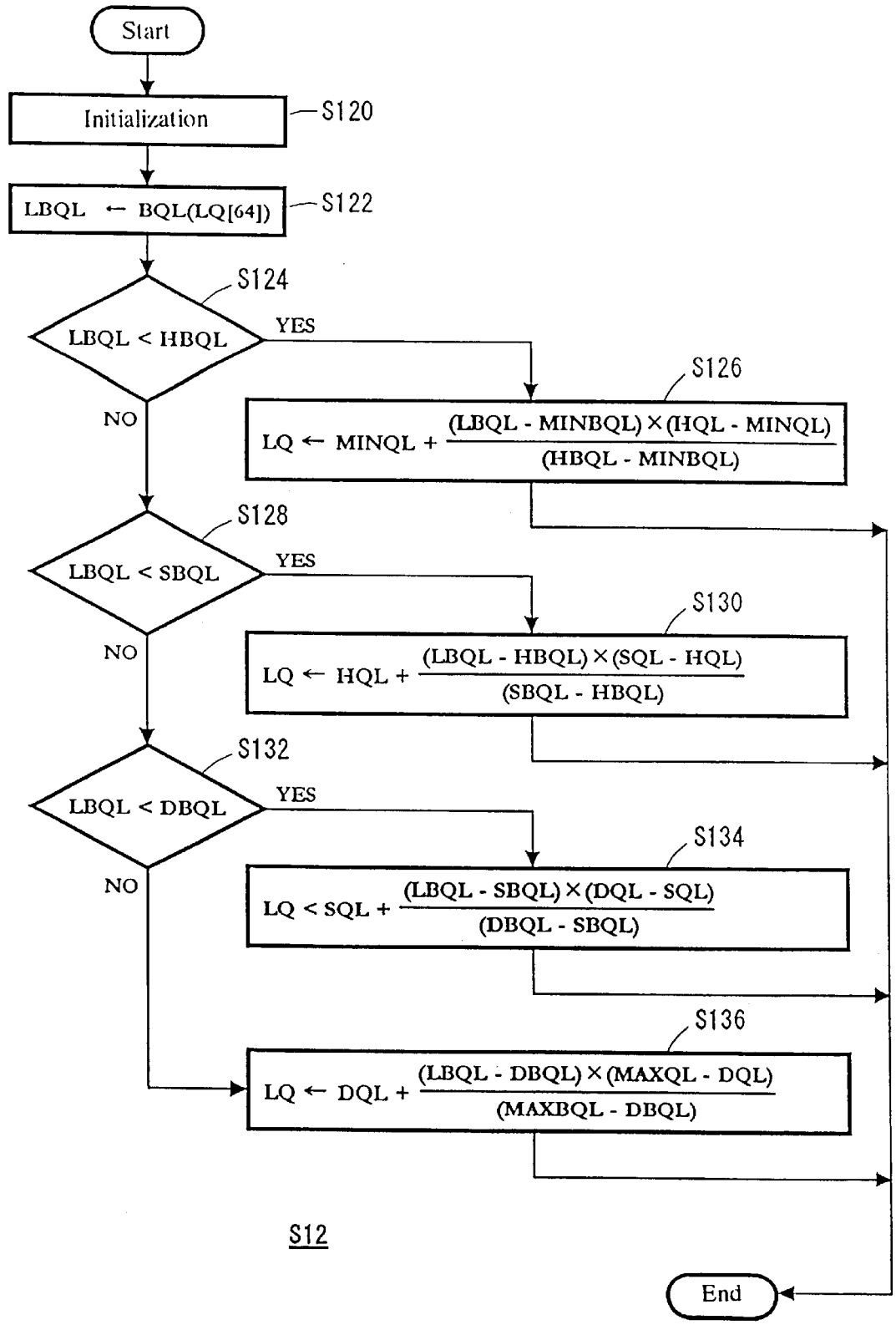

[Figure 10]
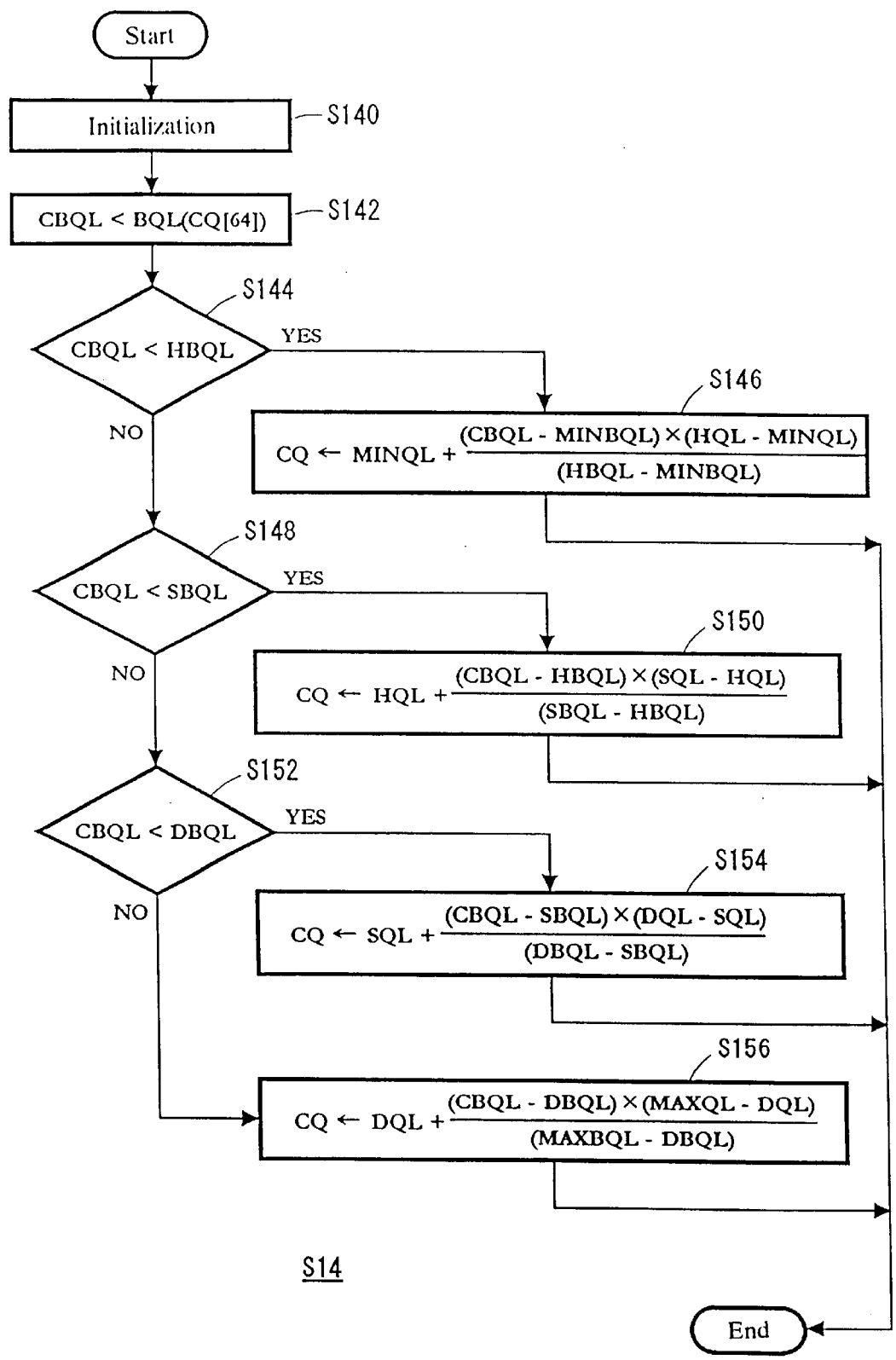

[Figure 11]
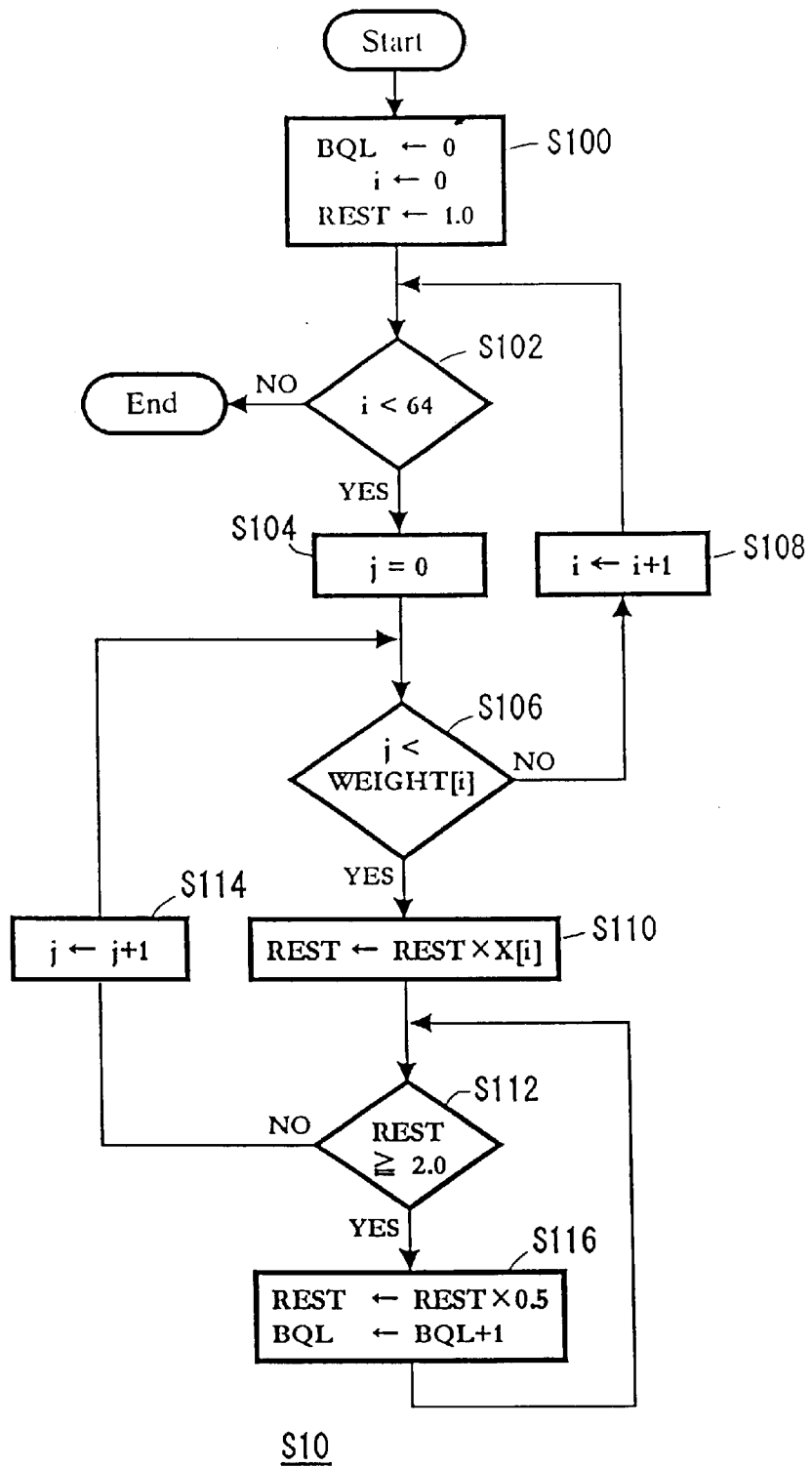

[Figure 13]
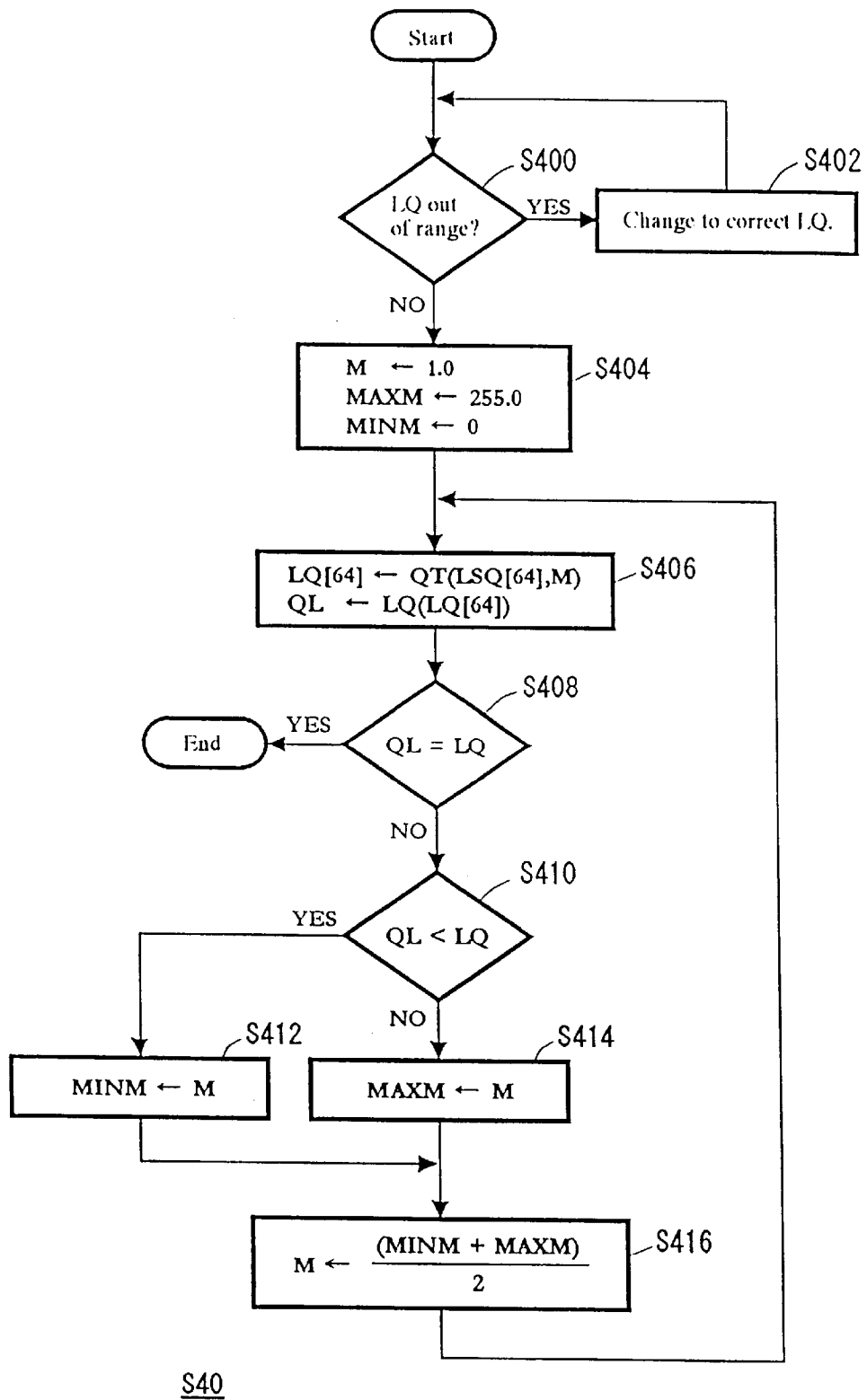

[Figure 14]
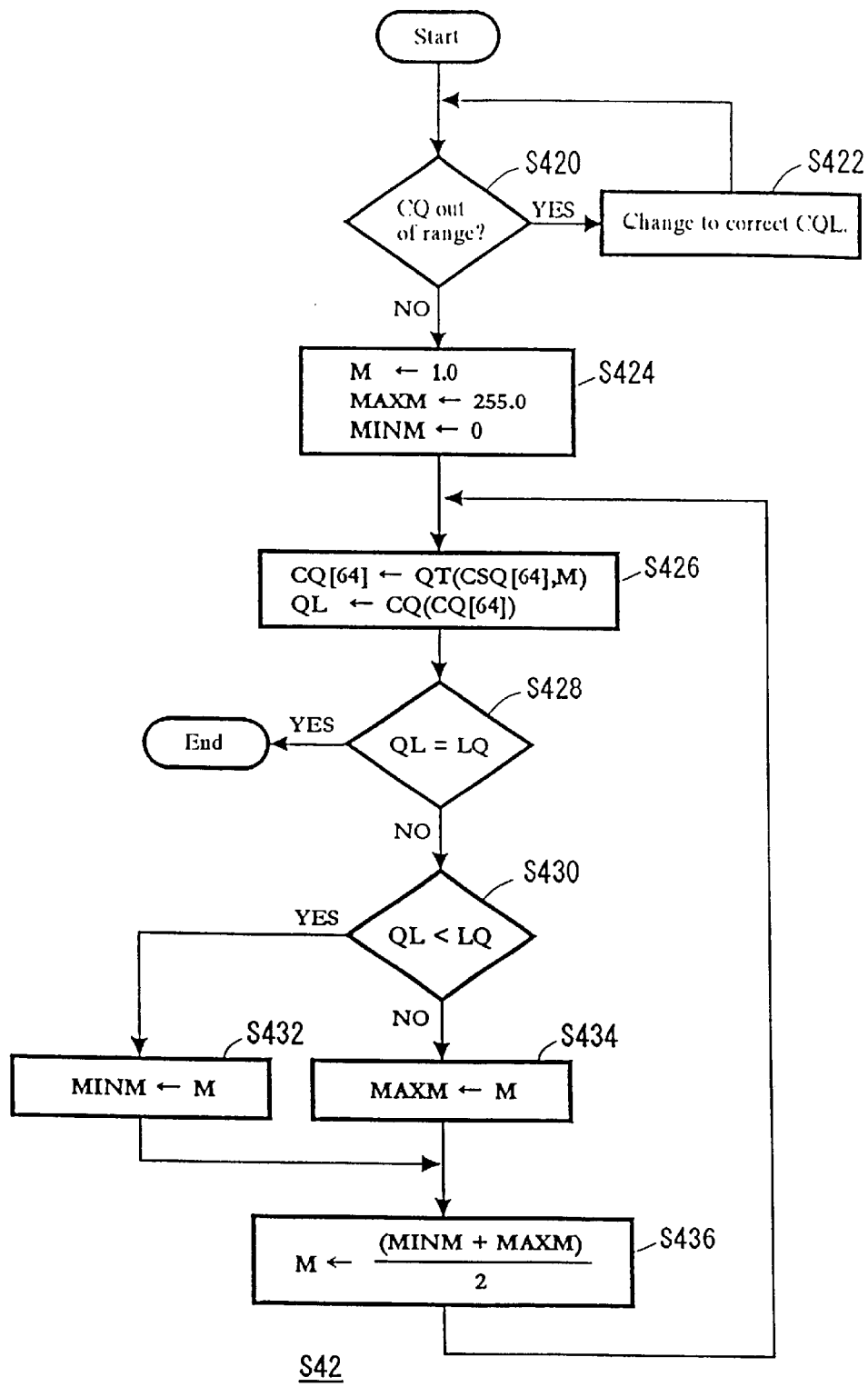

IMAGE DATA COMPRESSION APPARATUS AND METHOD THEREOF

FIELD OF THE INVENTION

The present invention relates to an image data compression apparatus for compressing image data and an image data compression method for compressing the image data. More particularly, the present invention relates to an image data compression apparatus and an image data compression method suitable for once expanding compressed image data compressed through the JPEG (Joint Photographic coding Experts Group) method including quantization and adjusting quantization levels, and compressing the data again.

BACKGROUND

To compress and code static-image data, a method referred to as JPEG (Joint Photographic coding Experts Group) is widely used. To compress a still image through the JPEG method, image data for one page is divided into, for example, pixel blocks respectively including 8×8 (64) pixels and compression is performed every pixel block. Each pixel block is discrete-cosine-transformed (DCT) into 8×8 DCT coefficients (frequency space image data).

The 8×8 DCT coefficients are divided by 8×8 quantization levels respectively corresponding to each of the DCT coefficients and quantized. A set of 8×8 quantization levels used for the quantization is also referred to as a quantization table. That is, when expressing each of 8×8 DCT coefficients as D(i,j) and each of the 8×8 quantization levels as Q(i,j), each DCT coefficient D(i,j) is divided by quantization level Q(i,j) corresponding to DCT coefficient D(i,j) in 8×8 quantization levels included in the quantization table and the quotient is output as quantized data. Thus, the quantized data obtained as a result of DCT and quantization is further coded through the run length limited coding and output as compressed image data together with a quantization table used for compression.

To expand and decode the compressed image data compressed and coded through the JPEG method, it is necessary to perform inversion of compression and coding. That is, it is possible to obtain original static-image data by decoding compressed image data through the run length limited method to generate quantization data, multiplying the quantized data by a quantization level corresponding to each quantized data value to generate a DCT coefficient, moreover applying inverse discrete cosine transform (IDCT) to these DCT coefficients, and thereby expanding and decoding the compressed image data.

As the software for compressing and expanding an image through the JPEG method, there is, for example, libjpeg whose source program is opened to the public by IJG (Independent JPEG Group). The libjpeg prepares two types of standard quantization tables, and adjusts quantization level values included in the quantization tables in accordance with the designation of image quality by a user when compressing and coding a still image so that compressed image data having an image quality desired by the user can be obtained.

However, in case of the conventional software for compressing and expanding an image such as the libjpeg, it is only possible to designate an image quality or compression ratio but it is impossible for a user to adjust quantization levels (quantization table). Therefore, a user cannot know quantization level values (quantization table) for obtaining the image quality and compression ratio designated by the user.

For example, in the case expanding the compressed image data according to the JPEG method using photo-retouching software and compressing, coding, and recording the data by changing compression ratios again, a user may erroneously set the compression ratio to wastefully and greatly increase the amount of the compressed image data.

In the case of the JPEG method, however, because some of image information is lost after compression and coding, even if compressed image data once compressed and coded at a predetermined compression ratio is expanded and decoded, and compressed and coded again at a compression ratio lower than the case of the first compression and coding, the image quality of the compressed image data is not improved though the amount of data increases. In this case, it is preferable to show a user the quantization level values used for compressing and coding compressed image data so that the user can directly adjust not a compression ratio but quantization level values (quantization table) only in the direction in which the amount of data decreases and prevent the amount of the compressed image data from wastefully increasing.

As described above, however, there are n×n (e.g. 64) quantization levels included in one quantization table. Therefore, even if showing a user all the quantization levels, the user is only disturbed but it is difficult to support the adjustment of quantization levels (quantization table) by the user. Therefore, it is preferable to obtain a single value for indexing many quantization levels included in a quantization table to show it to a user so that the user can adjust the quantization levels (quantization table) by changing the index values. Previously described methods for controlling values of quantization levels (quantization table) used to compress image data are not suitable for a user to adjust quantization levels.

SUMMARY OF THE INVENTION

An object of the present is to provide an image data compression apparatus and an image data compression method capable of knowing the content of a quantization table used to obtain an image quality and a compression ratio designated to compress and code image data.

It is another object of the present invention to provide an image data compression apparatus and an image data compression method allowing a user to easily adjust a quantization table and thereby to compress image data without wastefully increasing the amount of data.

It is still another object of the present invention to provide an image data compression apparatus and an image data compression method allowing a user to easily adjust quantization levels by changing displayed index values because of being able to obtain and display a single value for indexing many quantization levels included in a quantization table.

To attain the above objects, image data compression method, apparatus, and computer products of the present invention use an image data compression method and/or apparatus for compressing image data through a predetermined compression method to generate compressed image data, in which the compression method at least performs compression by using a combination of a plurality of quantization levels (quantization table) and thereby performing quantization. The compressed image data and the quantization table used to generate the compressed image data are correlated to each other. In an example embodiment, the apparatus comprises: image data decompression means for expanding first compressed image data generated through the compression method to generate expanded image data; quantization index value generation means for generating quantization index values for indexing values of the quantization levels included in a first quantization table correlated to the expanded first compressed image data; quantization index value change means for changing the generated quantization index values, quantization table generation means for setting values of the quantization levels included in the quantization table in accordance with the changed quantization index values to generate a second quantization table; and image data compression means for compressing the generated expanded image data through the compression method by using the generated second quantization table to generate second compressed image data.

It is preferable that the compression method applies predetermined conversion to the image data of every pixel block which includes a plurality of pixels, and compresses coefficients obtained as a result of the conversion by using quantization levels included in the quantization table and corresponding to the coefficients and thereby quantizing the coefficients. The image data decompression means has de-quantization means for inversely quantizing the pixel blocks included in the first compressed image data by using the first quantization table and inverse conversion means for applying conversion opposite to the predetermined conversion to the inversely-quantized pixel blocks to generate the expanded image data. The quantization index value change means changes the generated quantization index values in accordance with external operations. The image data compression means has conversion means for applying the predetermined conversion to the pixel blocks included in the generated expanded image data and quantization means for quantizing the converted pixel blocks by using the generated second quantization table to generate the second compressed image data.

It is preferable that the compression method applies discrete cosine transform (DCT) to the image data of every pixel block including n×n pixels and compresses n×n DCT coefficients obtained as a result of the DCT, by using n×n quantization levels included in the quantization table and corresponding to the DCT coefficients and thereby quantizing the DCT coefficients. In the image data decompression means, the de-quantization means inversely quantizes n×n quantized DCT coefficients of each of the pixel blocks included in the first compressed image data by using n×n quantization levels included in the first quantization table corresponding to the DCT coefficients. The inverse conversion means applies inverse discrete cosine transform (IDCT) to the n×n DCT coefficients of each of the inversely-quantized pixel blocks to use n×n IDCT coefficients obtained as a result of the IDCT as the expanded image data, and in the image data compression means. The conversion means applies DCT to n×n IDCT coefficients of each of the pixel blocks included in the generated expanded image data. The quantization means quantizes the n×n DCT coefficients of each of the discrete-cosine-transformed pixel blocks by using quantization levels included in the second quantization table and corresponding to the DCT coefficients to use the n×n quantized DCT coefficients as the second compressed image data.

It is preferable that the quantization index value generation means generates the single quantization index value reflecting values of the quantization levels included in the first quantization table, the quantization index value change means changes the generated single quantization index value in accordance with external operations, and the quantization table generation means generates the second quantization table including the quantization levels respectively reflecting the changed single quantization index value.

It is preferable that the quantization index value generation means weights logarithmic values of the quantization levels included in the first quantization table and calculates a value by accumulating the weighted logarithmic values to use the value as the quantization index value, and the quantization table generation means generates the second quantization table by changing the quantization levels included in a prepared standard quantization table or the first quantization table so that a value obtained by weighting and accumulating the logarithmic values of the quantization levels included in the standard quantization table or the first quantization table similarly to the case of calculating the quantization index value becomes equal to the changed quantization index value.

It is preferable that the quantization index value change means displays the generated quantization index value and changes the quantization index value in accordance with external operations for the displayed quantization index value.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 1 is an illustration showing the configuration of an example of image data compression apparatus for realizing an image data compression method of the present invention;

FIG. 2 is an illustration showing the configuration of an example of image data compression software for realizing an image data compression method of the present invention;

FIG. 3 is an illustration showing an example configuration of the JPEG compression unit of the JPEG compression and expansion unit shown in FIG. 1;

FIG. 4 is an illustration showing an example configuration of the block coding section of the JPEG compression unit shown in FIG. 3;

FIG. 5 is an illustration showing an example configuration of the JPEG expansion unit shown in FIG. 2;

FIG. 6 is an illustration showing an example configuration of the block decoding section shown in FIG. 5;

FIGS. 7(A) and 7(B) are illustrations showing example 8×8-configuration standard quantization tables, in which FIG. 7(A) shows the contents of a quantization table for a luminance component, and FIG. 7(B) shows the contents of a quantization table for a chrominance component;

FIG. 8 is a flow chart showing the outline of an example of a process performed for the quantization index value generation section (FIG. 5) to calculate a quantization index value;

FIG. 9 is a flow chart showing an example of a process of a function LQ (LQ[64]) for calculating a brightness-component quantization index value LQ in accordance with the brightness-component quantization table LQ[64] (FIG. 7(A)) of a first quantization table in the process shown in FIG. 8;

FIG. 10 is a flow chart showing an example of a process of a function CQ (CQ[64]) for calculating a chrominance component quantization index value CQ in accordance with the chrominance component quantization table CQ[64] FIG. 7(B)) of a first quantization table in the process S204 shown in FIG. 8;

FIG. 11 is a flow chart showing an example logarithmic-value sum calculation (BQL (X[64]); S10) for weighting quantization levels included in the brightness-component quantization table LQ[64](=LQ(i,j)) or chrominance component quantization table CQ[64](=CQ(i,j)) of a first quantization table, calculating logarithmic values of the weighted quantization levels using 2 as the base, and obtaining the sum of these logarithmic values in the processes shown in FIG. 9 and the processes shown in FIG. 10;

FIG. 12 is an illustration showing an example of a weighting table used for the logarithmic value calculation shown in FIG. 11;

FIG. 13 is a flow chart showing an example of a process for calculating a multiplier M to multiply with quantization levels in a standard quantization table for the brightness-component quantization table generation section shown in FIG. 2 to generate a second quantization table for luminance component; and FIG. 14 is a flow chart showing an example of a process for calculating a multiplier M to multiply with quantization levels in a standard quantization table for chrominance component quantization table generation section shown in FIG. 2 to generate a second quantization table for chrominance component.

DETAILED DESCRIPTION OF THE INVENTION

An image data compression apparatus of the present invention once expands compressed image data compressed through a compression method including quantization using a plurality of quantization levels as a process step and moreover, compresses the data again.

An image data compression apparatus of the present invention calculates and displays quantization index values reflecting values of quantization levels (quantization table) used for the first compression recorded or transmitted together with compressed image data and useful as indexes of the values of the quantization levels until compressing compressed image data again after expanding the compressed image data.

When a user reading the displayed quantization index value changes the value, an image data compression apparatus of the present invention changes values of the quantization levels included in a quantization table so as to reflect the changed quantization index value on values of the quantization levels and performs quantization using the quantization table whose content is changed when performing compression again.

As a compression method applicable to an image data compression apparatus of the present invention, the JPEG method is listed through which static-image data for one page is divided into n×n pixel blocks and the pixel blocks are discrete-cosine-transformed to quantize the data by using the n×n pixel blocks.

Moreover, to compress compressed motion picture data compressed through the MPEG method one frame by one frame, an image data compression apparatus of the present invention can be used to compress motion picture data. However, for simplification of description, a case will be described below as a specific example unless otherwise specified, in which an image data compression apparatus of the present invention is applied to the JPEG method for performing DCT every pixel block including n×n pixels and quantizing n×n DCT coefficients obtained as a result of the DCT by using a quantization table including n×n quantization levels corresponding to the DCT coefficients.

Image data decompression means expand compressed image data (first compressed image data) compressed through the JPEG method to generate expanded image data. As understood from the theory of the JPEG method, DCT coefficients (quantized DCT coefficients) quantized and moreover coded through the run length limited method are included in the compressed image data and the quantization table used for quantization is multiplexed. Because coding is not substantially related to description of an image data compression apparatus of the present invention, description of coding is omitted in the following explanation of this item.

De-quantization means in image data expansion means inversely quantize DCT coefficients, getting corresponding DCT coefficients of the compressed image data (first compressed image data) multiplied by quantization level included in the quantization table (first quantization table) used to compress the compressed image data recorded together with the image data.

Inverse conversion means applies inverse DCT (IDCT) to DCT coefficients obtained as a result of the above de-quantization every pixel block to return the DCT coefficients to original static-image data and outputs the data as expanded image data.

Quantization index value generation means calculates values of logarithms (e.g. logarithms respectively using 2 as the base) of values of n×n quantization levels included in a first quantization table, weights these logarithmic values by considering the influence on the image quality after expanded, adds (accumulates) all the weighted logarithmic values, and calculates quantization index values reflecting values of all quantization levels included in the first quantization table.

Weighting for calculation of quantization index values is performed so as to more weight the DC component and low-frequency component of a DCT coefficient greatly influencing the image quality after expanded and less weight the high-frequency component of the DCT coefficient less influencing the image quality after expanded.

Quantization index value change means displays the quantization index values calculated as described above on a CRT display unit to show them to a user. For example, when a user inputs a new quantization index value through a keyboard or the like, quantization index value change means changes the quantization index value in accordance with operations by the user.

Quantization table generation means changes values of n×n quantization levels included in a standard quantization table prepared in the above libjpeg or a quantization table (first quantization table) recorded together with compressed image data (first compressed image data) to generate a second quantization table.

When changing the values, the quantization table generation means sets values of the quantization levels included in the second quantization table so that quantization index values in the second quantization table calculated through the method same as the method for calculating the quantization index values of the first quantization table become equal to the quantization index values in the above changed first quantization table.

By changing quantization levels as described above, quantization table change means reflects the changed quantization index values in the first quantization table on all of n×n quantization levels in the second quantization table.

Image data compression means compresses expanded image data through the JPEG method by using the second quantization table generated as described above.

Image data compression means divides expanded image data for one page into pixel blocks respectively including n×n pixel and applies DCT to the pixel blocks to generate n×n DCT coefficients.

Quantization means performs quantization by dividing n×n DCT coefficients of each pixel block by n×n quantization levels in a second pixel table corresponding to these DCT coefficients to generate second compressed image data.

Moreover, an image data compression method of the present invention is an image data compression method for compressing image data through the JPEG method to generate compressed image data. In the method the JPEG method applies discrete cosine transform (DCT) to pixel blocks respectively constituted of n×n pixels constituting image data and quantizes n×n DCT coefficients obtained as a result of the DCT by using any corresponding one of n×n quantization levels included in a quantization table. The compressed image data and the quantization table used to generate the compressed image data are correlated to each other. First compressed image data generated through the JPEG method is expanded to generate expanded image data. A single quantization index value for indexing values of the n×n quantization levels included in the first quantization table correlated to the expanded first compressed image data is generated. The generated quantization index value is displayed, the quantization index value is changed in accordance with operation externally input for the displayed quantization index value. Values of the n×n quantization levels included in the quantization table are set. A second quantization table including the quantization index value equal to the changed quantization index value is generated, and the generated expanded image data is compressed through the JPEG method by using the generated second quantization table to generate second compressed image data.

In an embodiment of the present invention, a recording medium of the present invention records a program for compressing image data through a predetermined compression method to generate compressed image data. The compression method at least performs compression by using a combination of a plurality of quantization levels (quantization table) and thereby performing quantization. The compressed image data and the quantizaton table used to generate the compressed image data are correlated to each other. First compressed image data generated through the compression method is expanded, and a program is recorded which makes a computer execute the image data decompression step of generating expanded image data. The quantization index value generation step of generating quantization index values for indexing values of the quantization levels included in the first quantization table are correlated to the expanded first compressed image data. The quantization index value change step of changing values of the generated quantization index values, the quantization table generation step of setting values of the quantization levels included in the quantization table in accordance with the changed quantization index values to generate a second quantization table, and the image data compression step of compressing the generated expanded image data through the compression method by using the generated second quantization table to generate second compressed image data.

Example embodiments of the present invention are now described. FIG. 1 is an illustration showing an example of a configuration of an image data compression apparatus 1 for realizing an image data compression method of the present invention. As shown in FIG. 1, the image data compression apparatus 1 is configured by connecting an input unit 10, a CPU 14, a memory 16, an image display interface (IF) 18, a display unit 20 such as a CRT monitor, a storage unit 22, and a JPEG compression and expansion unit 3 through a bus 24. The input unit 10 is configured by an input IF 12, a keyboard 100, and an input device such as a mouse 102. The JPEG compression and expansion unit 3 is configured by a JPEG compression unit 30 and a JPEG expansion unit 40. That is, the image data compression apparatus 1 is configured by adding the JPEG compression and expansion unit 3 to a general computer.

FIG. 2 is an illustration showing an example of a configuration of image data compression software 5 for realizing an image data compression method of the present invention. As shown in FIG. 2, the image data compression software 5 is configured by a quantization index value generation section 50, a quantization index value display section 52, a quantization index value change section 54, and a quantization table generation section 56. The quantization table generation section 56 is configured by a brightness-component quantization table generation section 58 and a chrominance component quantization table generation section 60.

By referring to FIG. 1 again, components of the image data compression apparatus 1 will be described. The input unit 10 (FIG. 1) receives operations of a user for input devices such as the keyboard 100 and mouse 102 and outputs operation input data showing received operations to the CPU 14 or the like through the input IF 12.

The CPU 14 is configured by a general-purpose microprocessor and its peripheral circuits, which executes an operating system (OS) loaded into the memory 16 from the storage unit 22 and the image data compression software 5 (FIG. 2), controls components of the image data compression apparatus 1, and performs image data compression of the present invention.

The image display IF 18 displays expanded image data (confirmation image data) obtained by expanding compressed image data (input JPEG data) according to the JPEG method input from the storage unit 22 by the JPEG expansion unit 40 on the display unit 20. Moreover, the image display IF 18 displays quantization index values generated by process a quantization table input from the storage unit 22 together with input JPEG data by the quantization index value display section 52 (FIG. 2) of the image data compression software 5 on the display unit 20.

The storage unit 22 uses a hard disk drive (HDD) or a photomagnetic disk drive (MOD), which operates in accordance with the control by the CPU 14 and image data compression software 5 (FIG. 2) to write and read data in and from a recording medium (not illustrated) such as a hard disk or photomagnetic disk. That is, the storage unit 22 stores software such as the OS recorded in the above recording medium and the image data compression software 5 (FIG. 2) and loads the stored software into the memory 16. Moreover, the storage unit 22 stores the input JPEG data supplied from an external unit through a communication line (not illustrated) or supplied by being recorded in a recording medium in the above recording medium and outputs the stored input JPEG data to the JPEG expansion unit 40. Furthermore, the storage unit 22 stores compressed image data (output JPEG data) according to the JPEG method generated by the JPEG compression unit 30 in the above recording medium.

FIG. 3 is an illustration showing an example of a configuration of the JPEG compression unit 30 of the JPEG compression and expansion unit 3 shown in FIG. 1. As shown in FIG. 3, the JPEG compression unit 30 is configured by a color space conversion section 300 and the block coding section 310.

FIG. 4 is an illustration showing an example of a configuration of a block coding section 310 of the JPEG compression unit 30 shown in FIG. 3.

As shown in FIG. 4, the block coding section 310 is configured by a DCT section 312, a quantization section 314, an entropy coding section 316, and a multiplexing section (MUX) 318.

In the JPEG compression and expansion unit 3, the JPEG compression unit 30 (FIG. 3) compresses the input JPEG data expanded by the JPEG expansion unit 40 by using a second quantization table input from the quantization table generation section 56 through the same JPEG method and outputs the input JPEG data to the storage unit 22 (or JPEG expansion unit 40 shown in FIG. 2).

In the JPEG compression unit 30, the color space conversion section 300 converts red data, green data, and blue data (RGB data) configuring the expanded image data input from the JPEG expansion unit 40 into brightness data (Y) and two chrominance data values (Cr and Cb) and moreover, divides them into pixel blocks respectively including 8×8 (64) pixels, and outputs the pixel blocks to the block coding section 310 as 8×8-configuration block image data.

Chrominance component sampling ratio data is, for example, data previously selected by a user and set to the JPEG compression unit 30, which is used to designate a method for reducing the amount of data by thinning chrominance components in the color space conversion section 300. For example, in the JPEG method, chrominance component sampling ratio data having a format referred to as 4:2:2 shows that a luminance component and two chrominance components are respectively sampled at a ratio of 4:2 in the horizontal direction but the chrominance components are not thinned in the vertical-directional sampling.

Moreover, chrominance component sampling ratio data having a format referred to as 4:2:0 shows that a luminance component and two chrominance components are sampled at a ratio of 4:2 in the horizontal direction and the chrominance components are thinned up to ½ in vertical-directional sampling. The color space conversion section 300 reduces the amount of data by thinning the chrominance data Cb and Cr in accordance with chrominance component sampling ratio data when converting the RGB data of expanded image data into brightness data Y and chrominance data Cb and Cr and outputs the reduced data to the block coding section 310.

The block coding section 310 applies discrete cosine transform (DCT) to 8×8 block image data input from the color space conversion section 300, quantizes the data by using a second quantization table input from the quantization table generation section 56 (FIG. 2) of the image data compression software 5, and moreover applies entropy coding such as run length limited coding to the data, and outputs the data to the storage unit 22 or JPEG expansion unit 40 as output JPEG data.

In the block coding section 310, the DCT section 312 applies discrete cosine transform (DCT) to 8×8 block image data input from the color space conversion section 300 and outputs 8×8-configuration DCT coefficients obtained as a result of the DCT to the quantization section 314 as 8×8-configuration frequency-space image data of each of the brightness data Y and chrominance data Cr and Cb.

The quantization section 314 quantizes 8×8-configuration frequency-space image data Y, Cb, and Cr input from the DCT section 312 by using quantization levels included in an 8×8-configuration quantization table (second quantization table) input from the quantization table generation section 56 (FIG. 2) of the image data compression software and outputs the data to the entropy coding section 316. That is, the quantization section 314 divides 8×8 DCT coefficients $D(i,j)$ by quantization levels $Q(i,j)$ of the second quantization table (i,j=1 to 8) and outputs obtained 8×8 quotients to the entropy coding section 316 as quantization data.

The entropy coding section 316 applies entropy coding such as run length limited coding to the quantized data input from the entropy coding section 316 to generate compressed image data and outputs the data to the multiplexing section 318.

The multiplexing section 318 correlates compressed image data input from the entropy coding section 316, chrominance component sampling ratio data used for the color space conversion section 300, and a second quantization table input from the quantization table generation section 56 each other by multiplexing them and outputs them to the storage unit 22 or JPEG expansion unit 40 as output JPEG data.

FIG. 5 is an illustration showing the configuration of the JPEG expansion unit 40 shown in FIG. 2. As shown in FIG. 5, the JPEG expansion unit 40 is configured by a separation (DEMUX) section 400, a block decoding section 410, and a color space conversion section 404.

FIG. 6 is an illustration showing the configuration of the block decoding section 410 shown in FIG. 5. As shown in FIG. 6, the block decoding section 410 is configured by an entropy decoding section 412, a de-quantization section 414, and an inverse discrete cosine transform (IDCT) section 416.

The JPEG expansion unit 40 (FIG. 5) expands the input JPEG data input from the storage unit 22 or the output JPEG data input from the JPEG compression unit 30 in accordance with an operation by a user through the JPEG method, generates expanded image data or confirmation image data, displays the data on the display unit 20 through the image display IF 18 (FIG. 1), and outputs the data to the JPEG compression unit 30.

The separation section 400 (FIG. 6) separates compressed image data, chrominance component sampling ratio data, and a quantization table from input JPEG data, outputs the compressed image data and quantization table to the block decoding section 410 and quantization index value generation section 50 (FIG. 2), and outputs the chrominance component sampling ratio data to the color space conversion section 404.

The block decoding section 410 performs process opposite to that performed by the block coding section 310 shown in FIGS. 3 and 4.

That is, the block decoding section 410 inversely quantizes the compressed image data input from the separation section 400 by using the quantized data input from the separation section 400, returns the image data to 8×8-configuration frequency-space image data, moreover applies IDCT to the 8×8-configuration frequency-space image data to return the image data to 8×8-configuration block image data, and outputs the block image data to the color space conversion section 404.

In the block decoding section 410, the entropy decoding section 412 performs process opposite to that performed by the entropy coding section 316 (FIG. 4).

That is, the entropy decoding section 412 entropy-decodes the compressed image data input from the separation section 400 through a method corresponding to the method used for the entropy coding section 316 (FIG. 4) and outputs the 8×8-configuration decoded data obtained as a result of the decoding to the de-quantization section 414.

The de-quantization section 414 performs process opposite to that performed by the quantization section 314 (FIG. 4), inversely quantizes the 8×8-configuration decoded data input from the entropy decoding section 412 by using the quantization levels included in the quantization table input from the separation section 400 and generates 8×8-configuration frequency-space image data to output the image data to the IDCT section 416.

That is, the de-quantization section 414 multiples 8×8 decoded data De(i,j) with quantization levels Q(i,j) included in the quantization table input from the separation section 400 and outputs obtained 8×8 products to the section 416 as 8×8-configuration frequency-space image data.

The IDCT section 416 performs process opposite to that performed by the DCT section 312 (FIG. 4), applies IDCT to the 8×8-configuration frequency-space image data input from the de-quantization section 414 to generate original 8×8-configuration block image data and outputs the image data to the color space conversion section 404.

The color space conversion section 404 (FIG. 5) applies process opposite to that performed by the color space conversion section 300 to the brightness data Y and chrominance data Cr and Cb included in the block image data input from the block decoding section 410 (IDCT section 416). That is, the color space conversion section 404 complements the chrominance data Cr and Cb thinned in the color space conversion 300 (FIG. 3) in accordance with the chrominance component sampling ratio input from the separation section 400 and moreover, converts the complemented chrominance data Cr and Cb and the brightness data Y into RGB data to output the RGB data to the image display IF 18 (display unit 20 in FIG. 1) as the expanded image data and the JPEG compression unit 30.

The image data compression software 5 will be described below by referring to FIG. 2 again. The image data compression software 5 displays the compressed image data (expanded image data) according to the JPEG method expanded by the JPEG expansion unit 40 on the display unit 20 through the image display IF 18. Moreover, the image data compression software 5 changes a quantization index value for reflecting all values of the n×n quantization levels included in the quantization table (first quantization table) supplied from the block decoding section 410 (FIG. 5) used to generate the input JPEG data, displays the quantization index value to be indexed (first quantization index value before changed) on the display unit 20 to show the quantization index value to a user, and changes the quantization index value in accordance with an operation by the user.

FIGS. 7(A) and 7(B) are example illustrations showing 8×8-configuration standard quantization tables, in which FIG. 7(A) shows the contents of a quantization table for luminance component and FIG. 7(B) shows the contents of a quantization table for chrominance component. Moreover, as exemplified in FIGS. 7(A) and 7(B), with respect to the image data compression software 5, standard quantization tables are open to the public so as to be used for a reference in the JPEG method, which changes the quantization levels included in a standard quantization table normally used or an input-JPEG-data quantization table (first quantization table) so that the quantization index value (second quantization index value) in the changed second quantization table calculated through the method same as the case of the first quantization table approaches the changed first quantization index value as close as possible.

Then, to simplify explanation, a case will be described below in which the image data compression software 5 changes values of a standard quantization table unless otherwise specified.

The image data compression software 5 compresses expanded image data again through the JPEG method by using the changed second quantization table to generate compressed image data (second compressed image data) and makes the storage unit 22 store the compressed image data. Moreover, the image data compression software 5 expands the second compressed image data again to generate expanded image data (confirmation image data) used to confirm the image quality of the second compressed image data and displays the data on the display unit 20.

In the image data compression software 5 (FIG. 2), the quantization index value generation section 50 reflects values of all quantization levels included in the first quantization table in accordance with the chrominance component sampling ratio data input from the JPEG expansion unit 40, generates a quantization index value to be indexed, and outputs the index value to the quantization index value display section 52 and quantization index value change section 54.

The process of the quantization index value generation section 50 will be described below by further referring to FIGS. 8 to 12. FIG. 8 is a flow chart showing an example of an outline of the process performed to calculate a quantization index value by the quantization index value generation section 50 (FIG. 5).

FIG. 9 is a flow chart showing an example of an process (S12) of a function LQ (LQ[64]) for calculating a brightness-component quantization index value LQ in accordance with a brightness-component quantization table LQ[64] (FIG. 7(A)) of the first quantization table in the process in S204 shown in FIG. 8.

FIG. 10 is an example of a flowchart showing the process (S14) of a function CQ (CQ [64]) for calculating a chrominance component quantization index value CQ in accordance with a chrominance component quantization table CQ[64] (FIG. 7(B)) of the first quantization table in the process in S204 shown in FIG. 8.

FIG. 11 is an example of a flow chart showing the logarithmic-value sum calculation (BQL (X[64]); S10) for weighting quantization levels included in the brightness-component quantization table LQ[64] (=LQ(i,j)) or chrominance component quantization table CQ[64] (=CQ(i,j)) of the first quantization table, calculating logarithmic values of the weighted quantization levels using 2 as the base, and obtaining the sum of these logarithmic values in the processes in S120 and S122 in FIG. 9, and in the processes in S140 and S142 in FIG. 10.

FIG. 12 is an illustration showing a weighting table used for the logarithm calculation shown in FIG. 11.

As shown in FIG. 8, in step 200 (S200), the quantization index value generation section 50 decides whether input JPEG data is data for a color image (color) or monochrome image (gray), and it starts the process in S204 when the input JPEG data is a color image but starts the process in S202 when input JPEG data is other than the color image (that is, when the data is a monochrome image).

Whether the input JPEG data is the data for a color image or monochrome image can be known through the data showing the number of components included in the JPEG data. That is, it is possible to decide that the input JPEG data is data for a monochrome image when the number of components is 1 and data for a color image when the number of components is 3.

In step 202 (S202), the quantization index value generation section 50 calls only the function LQ (LQ[64]) (to be mentioned later by referring to FIG. 9) for calculating a brightness-component quantization index value, calculates only the brightness-component quantization index value LQ in accordance with the brightness-component quantization table LQ[64] input from the JPEG expansion unit 40, and outputs the index value LQ as a final single quantization index value UQ. Thus, the brightness-component quantization index value LQ is directly used as the quantization index value UQ because no chrominance component is included when the input JPEG data is data for a monochrome image. In step 204 (S204), the quantization index value generation section 50 calls the functions LQ (LQ[64]) and CQ (CQ[64]) (to be mentioned later by referring to FIGS. 9 and 10) for calculating a brightness-component index value and a chrominance component quantization index value to calculate the brightness-component index value LQ and chrominance component quantization index value CQ in accordance with the brightness-component quantization table LQ[64] and chrominance component quantization table CQ[64] input from the JPEG expansion unit 40. In step 206 (S206), the quantization index value generation section 50 calculates the number of brightness-component blocks LB for MCU (minimum coding unit) and the number of chrominance component blocks CB for MCU in accordance with the chrominance component sampling ratio data input from the JPEG expansion unit 40, adds the product of the number of blocks LB and a quantization index value LBL to the product of the number of blocks CB and a quantization index value CBL, and calculates a weighted average [(LB×LQ+CB×CQ)/(LB+CB)] by dividing the addition result by the addition value of the numbers of blocks LB and CB to use the weighted average as a final single quantization index value UQ.

Thus, a weighted average corresponding to the sampling ratio of the quantization index values LQ to CQ is used as the quantization index value UQ because, as described above in the description of the JPEG compression unit 30, in the JPEG method, chrominance data Cb and Cr are thinned in accordance with chrominance component sampling ratio data in order to reduce the amount of data when RGB data for a still image is converted into brightness data Y and the chrominance data Cb and Cr.

When the chrominance component sampling ratio data shows 4:2:2, the number of pixel blocks included in one MCU is 4, the number of brightness-component blocks LB in these pixel blocks is 2, and the number of chrominance component blocks CB is 2.

Moreover, when the chrominance component sampling ratio data shows 4:2:0, the number of pixel blocks included in one MCU is 6, the number of brightness-component blocks LB in these pixel blocks is 4, and the number of chrominance component blocks is 2.

Therefore, by considering the number of brightness-component blocks LB and the number of chrominance component blocks CB for each MCU and thereby calculating the weighted average, a ratio of contribution to compressed image quality and amount of data of each of the quantization tables LQ[64] and CQ[64] is reflected on the quantization index value UQ, and the quantization index value UQ is set to better index values of quantization levels included in the quantization tables LQ[64] and CQ[64].

In S204 shown in FIG. 8, when the function LQ (LQ[64]) (S12) for calculating a brightness-component quantization index value is called, the quantization index value generation section 50 calculates temporary variables MINBQL, HBQL, SBQL, DBQL, and MAXBQL in step 12 (sic) (S120) as shown in FIG. 9 to perform initialization.

That is, the quantization index value generation section 50 performs logarithmic-value calculation BQL (MINQ[64]) (to be mentioned later by referring to FIG. 11) by assuming that a processing object is a quantization table MINQ[64] in which values of 64 components are all set to 1 and the quantization level is the smallest to calculate the temporary variable MINBQL.

Moreover, the quantization index value generation section 50 performs logarithmic-value calculation BQL (LSQ[64]) by assuming a process object as a quantization table LSQ [64] in which values of 64 components are respectively properly set to a standard value (e.g. as shown in FIG. 7(A)) in accordance with a purpose and which is suited to generate compressed image data having a standard compression ratio to calculate the temporary variable SBQL.

Furthermore, the quantization index value generation section 50 performs logarithmic-value calculation BQL (LHQ[64]) by assuming a process object as a quantization table LHQ[64] in which 64 components are respectively set to a value ½ a corresponding quantization level in the quantization table LSQ[64] and which is suited to generate compressed image data having a low compression ratio and a large amount of data to calculate the temporary variable HBQL.

Furthermore, the quantization index value generation section 50 performs logarithmic-value calculation BQL (LDQ[64]) by assuming a process object as a quantization table LDQ[64] in which 64 components are respectively set to a value two times larger than a corresponding quantization level in the quantization table LSQ[64] and which is suited to generate compressed image data having a high compression ratio and a small amount of data to calculate the temporary variable DBQL.

Furthermore, the quantization index value generation section 50 performs logarithmic-value calculation BQL (MAXQ[64]) by assuming a process object as a quantization table MAXQ[64] in which all values of 64 components are set to the maximum value 255 (=$2^8$−1) and which has the largest quantization level value to calculate the temporary variable MAXBQL.

Furthermore, the quantization index value generation section 50 substitutes, for example, values 0, 25, 50, 75, and 100 for a value MINQL predetermined as a quantization index value for providing the minimum compression ratio (maximum amount of data after compression), a value HQL predetermined as a quantization index value for providing a relatively low compression ratio (relatively large amount of data after compression), a value SQL predetermined as a quantization index value for providing a standard compression ratio (standard amount of data after compression), a value DQL predetermined as a quantization index value for providing a relatively high compression ratio (relatively small amount of data after compression), and a value MAXQL predetermined as a quantization index value for providing the maximum compression ratio (minimum amount of data after compression).

Thus, MINQL, HQL, SQL, DQL, and MAXQL are set so that the values increase from MINQL to MAXQL in order such as 0, 25, 50, 75, and 100 while values decrease from MINBQL toward HBQL, SBQL, DBQL, and MAXBQL in order to further improve the quality of images obtained from the JPEG compression unit 30 as the quantization index value LQ increases.

In step 122 (S122), the quantization index value generation section 50 performs the logarithmic-value calculation BQL (LQ[64]) by assuming a process object as a first quantization table LQ[64] for luminance component to calculate a temporary variable LBQL.

In the following processes (S124 to S136), the quantization index value generation section 50 applies linear interpolation to the temporary variable LBQL so that the quantization index value LQ becomes equal to the operation value SQL when using a standard quantization table for luminance component according to the JPEG method, the quantization index value becomes equal to the operation value HQL when all quantization levels are ½ corresponding factors in the standard quantization table, the quantization index value becomes equal to the operation value DQL when all quantization levels are two times larger than corresponding factors in the standard quantization table, the quantization index value becomes equal to the operation value MINQL when all quantization levels are equal to the maximum value 255, and the quantization index value becomes equal to the operation value MAXQL when all quantization levels are equal to the minimum value 1, thereby to calculate a quantization index value LQ.

In step 124 (S124), the quantization index value generation section 50 decides whether the temporary variable LBQL is smaller than the temporary variable HBQL, and it starts the process in S126 when LBQL is smaller than HBQL but starts the process in S128 unless LBQL is smaller than HBQL.

In step 126 (S126), the quantization index value generation section 50 obtains the quantization index value LQ by performing linear interpolation between HQL and MINQL in accordance with the value of the temporary variable LBQL. That is, the quantization index value generation section 50 sets the quantization index value LQ to MINQL+(LBQL−MINBQL)×HQL−MINQL)/(HBQL−MINBQL).

In step 128 (S128), the quantization index value generation section 50 decides whether the temporary variable LBQL is smaller than the temporary variable SBQL, and it starts the process in S130 when LBQL is smaller than SBQL but starts the process in S132 unless LBQL is smaller than SBQL.

In step 130 (S130), the quantization index value generation section 50 obtains the quantization index value LQ by performing linear interpolation between SQL and HQL in accordance with the value of the temporary variable LBQL. That is, the quantization index value generation section 50 sets the quantization index value LQ to HQL+(LBQL−HBQL)×(SQL−HQL)/(SBQL−HBQL).

In step 132 (S132), the quantization index value generation section 50 decides whether the temporary variable LBQL is smaller than the temporary variable DBQL, and it starts the process in S134 when LBQL is smaller than DBQL but starts the process in S136 unless LBQL is smaller than DBQL.

In step 134 (S134), the quantization index value generation section 50 obtains the quantization index value LQ by performing linear interpolation between DQL and SQL in accordance with the value of the temporary variable LBQL. That is, the quantization index value generation section 50 sets the quantization index value LQ to SQL+(LBQL−SBQL)×(DQL−SQL)/(DBQL−SBQL).

In step 136 (S136), the quantization index value generation section 50 obtains the quantization index value LQ by performing linear interpolation between MAXQL and DQL in accordance with the value of the temporary variable LBQL. That is, the quantization index value generation section 50 sets the quantization index value LQ to DQL+(LBQL−DBQL)×(MAXQL−DQL)/(MAXBQL−DBQL).

In the process in S204 shown in FIG. 8, when the function CQ (CQ[64]) (S14) for calculating a chrominance component quantization index value is called, the quantization index value generation section 50 performs the same process as the case in which the function LQ (LQ[64]) for calculating a brightness-component quantization index value is called to calculate the chrominance component quantization index value CQ.

That is, as shown in FIG. 10, in step 140 (S140), the quantization index value generation section 50 calculates the temporary variables MINBQL, HBQL, SBQL, DBQL, and MAXBQL similarly to the case of S120 (FIG. 9) to perform initialization. Moreover, the quantization index value generation section 50 substitutes values 0, 25, 50, 75, and 100 for the values MINQL, HQL, SQL, DQL, and MAXQL similarly to the case of S120. In step 142 (S122)(sic), the quantization index value generation section 50 performs logarithmic-value sum calculation BQL (CQ[64]) by assuming a process object as the first quantization table CQ[64] for chrominance component to calculate the temporary variable CBQL.

In the following processes (S144 to S146), the quantization index value generation section 50 applies linear interpolation to the temporary variable CBQL so that the quantization index value CQ becomes equal to the operation value SQL when using a standard quantization table for chrominance component, the quantization index value becomes equal to the operation value HQL when quantization levels are ½ the standard quantization table, the quantization index value becomes equal to the operation value DQL when quantization levels are two times larger than the standard quantization table, the quantization index value becomes equal to the operation value MINQL when all quantization levels are equal to the maximum value 255, and the quantization index value becomes equal to the operation value MAXQL when all quantization levels are equal to the minimum value 1, similarly to the case of S124 to S126.

In step 144 (S144), the quantization index value generation section 50 decides whether the temporary variable CBQL is smaller than the temporary variable HBQL, and it starts the process in S146 when CBQL is smaller than HBQL but starts the process in S148 unless CBQL is smaller than HBQL. In step 146 (S146), the quantization index value generation section 50 sets the quantization index value CQ to MINQL+(CBQL−MINBQL)×(HQL−MINQL)/(HBQL−MINBQL). In step 148 (S148), the quantization index value generation section 50 decides whether the temporary variable CBQL is smaller than the temporary variable SBQL, and it starts the process in S150 when CBQL is smaller than SBQL but starts the process in S152 unless CBQL is smaller than SBQL. In step 150 (S150), the quantization index value generation section 50 sets the quantization index value CQ to HQL+(CBQL−HBQL)×(SQL−HQL)/(SBQL−HBQL). In step 152 (S152), the quantization index value generation section 50 decides whether the temporary variable CBQL is smaller than the temporary variable DBQL, and it starts the process in S154 when CBQL is smaller than DBQL but starts the process in S156 unless CBQL is smaller than DBQL. In step 154 (S154), the quantization index value generation section 50 sets the quantization index value CQ to SQL+(CBQL−SBQL)×(DQL−SQL)/(DBQL−SBQL). In step 156 (S156), the quantization index value generation section 50 sets the quantization index value CQ to DQL+(CBQL−DBQL)×(MAXQL−DQL)/(IMAXBQL−DBQL).

Hereafter, the process will be described by referring to FIG. 11, in which the quantization index value generation section 50 weights quantization levels included in the quantization tables LQ[64] and CQ[64] and calculates logarithmic values to obtain the sum of these logarithmic values.

As shown in FIG. 11, in step 100 (S100), the quantization index value generation section 50 substitutes values 0, 0, and 1. 0 for a logarithmic-value sum BQL and temporary variables i and REST to perform initialization. In step 102 (S102), the quantization index value generation section 50 decides whether the temporary variable i is smaller than 64, and it starts the process in S104 when the variable i is smaller than 64 but ends the process in S104 unless the variable i is smaller than 64 and delivers the logarithmic-value sum BQL (X[64]) to the processes in S120 and S122 or S140 and S142 (FIGS. 9 and 10).

In step 104 (S104), the quantization index value generation section 50 initializes a temporary variable j to 0. In step 106 (S106), the quantization index value generation section 50 fetches one weighted coefficient WEIGHT[i] from the weighting table shown in FIG. 12, decides whether the temporary variable j is smaller than the weighted coefficient WEIGHT[i], and it starts the process in S110 when the temporary variable j is smaller than the weighted coefficient WEIGHT[i] but starts the process in S108 unless the variable j is smaller than the coefficient.

As understood by referring to FIG. 12, among the weighted coefficients, a coefficient corresponding to a DC component and a low-frequency component in which quantization levels greatly influence the image quality is set to a large value and a coefficient corresponding to a high-frequency component in which quantization levels do not greatly influence the image quality is set to a small value. In step 108 (S108), the quantization index value generation section 50 increments the temporary variable i (i=i+1). In step 110 (S110), the quantization index value generation section 50 fetches one quantization level X[i] from quantization tables (LMINQ[64], CMINQ[64], LQ[64], and CQ[64], generally referred to as X[64]) which are process objects in S120 and S122 (FIG. 9) or S140 and S142 (FIG. 10) and updates the value of the temporary variable REST to a value obtained by multiplying the temporary variable REST by the quantization level X[i] (REST=REST×X[i]). In step 112 (S112), the quantization index value generation section 50 decides whether the temporary variable REST is 2.0 or more, and it starts the process in S116 when REST is 2.0 or more but starts the process in S114 unless REST is 2.0 or more. In step 114 (S114), the quantization index value generation section 50 increments the temporary variable j (j=j+1). In step 116 (S116), the quantization index value generation section 50 updates the temporary variable REST to a value obtained by multiplying the temporary variable REST by 0.5 (REST=REST×0.5) and increments the logarithmic-value sum BQL (BQL=BQL+1).

The quantization index value display section 52 displays a single quantization index value UQ generated by the quantization index value generation section 50 on the display unit 20 through the image display IF 18.

The quantization index value change section 54 receives the input of an operation for changing quantization index values performed for the input unit 10 by a user and outputs a received changed quantization index value UQ' to the brightness-component quantization table generation section 58 and chrominance component quantization table generation section 60 of the quantization table generation section 56.

The brightness-component quantization table generation section 58 multiplies quantization levels included in the standard quantization table for luminance component shown in FIG. 7(A) by a multiplier M to generate a second quantization table for luminance component for providing a quantization index value equal to the changed quantization index value UQ' input from the quantization index value change section 54 and outputs the second quantization table to the JPEG compression unit 30.

The process of the brightness-component quantization table generation section 58 to calculate a multiplier M to multiply with quantization levels in a standard quantization table will be described below by referring to FIG. 13. FIG. 13 is a flow chart showing the process (S40) for calculating a multiplier M to multiply with quantization levels in a standard quantization table for the brightness-component quantization table generation section 58 shown in FIG. 2 to generate a second quantization table for luminance component.

The brightness-component quantization table generation section 58 first determines the minimum and maximum values of a multiplier M and then calculates a final multiplier M by successively changing the value of the multiplier M in accordance with the dichotomy until quantization index values in a standard quantization table obtained by multiplying quantization levels by the multiplier M become equal to the changed quantization index value UQ'.

As shown in FIG. 13, in step 400 (S400), the brightness-component quantization table generation section 58 substitutes the changed quantization index value UQ' for the quantization index value LQ of a quantization table for luminance component to decide whether the quantization index value LQ is kept in a range of 0 to 100 and it starts the process in S404 when the quantization index value LQ is kept in the range of 0 to 100 but starts the process in S402 unless the quantization index value LQ is kept in the range of 0 to 100.

In step 402 (S402), the brightness-component quantization table generation section 58 sets the quantization index value LQ to 0 when it is less than 0 and sets the value to 100 when the quantization index value LQ is 100 or more so that the quantization index value LQ is kept in a correct range. In step 404 (S404), the brightness-component quantization table generation section 58 substitutes 1.0, 255.0 and 0 for a multiplier M and the maximum value MAXM and minimum value MINM of the multiplier M to perform initialization. In step 406 (S406), the brightness-component quantization table generation section 58 changes the quantization table LQ[64] to quantization table QT (LSQ[64], M) obtained by normalizing values of a quantization levels larger than 255 into 255 by multiplying quantization levels in the standard quantization table LSQ[64] shown in FIG. 7(A) by a multiplier M and setting values of quantization levels resulting in less than 1 as a result of the multiplication to 1.

Moreover, the brightness-component quantization table generation section 58 performs the logarithmic-value sum calculation shown in FIG. 11 by assuming a process object as the quantization table LQ[64] (=QT(LSQ[64], M)) to calculate the sum of logarithmic values in the quantization table LQ[64] and substitutes the sum for a temporary variable QL. In step 408 (S408), the brightness-component quantization table generation section 58 decides whether the temporary variable QL is equal to the quantization index value LQ (=UQ') and multiplies quantization levels in the standard quantization table for luminance component (FIG.

7(A)) by a multiplier M and outputs the multiplication result to the JPEG compression unit 30 as a second quantization table for luminance component when the variable QL is equal to the quantization index value LQ but starts the process in S410 unless QL is equal to LQ. In step 410 (S410), the brightness-component quantization table generation section 58 decides whether the temporary variable QL is smaller than the quantization index value LQ and starts the process in S412 when QL is smaller than LQ but starts the process in S414 unless QL is smaller than LQ. In step 412 (S412), the brightness-component quantization table generation section 58 substitutes a multiplier M for the minimum value MINM of the multiplier M (MINM=M). In step 414 (S414), the brightness-component quantization table generation section 58 substitutes the multiplier M for the maximum value MAXM of the multiplier M (MAXM=M). In step 416 (S416), the brightness-component quantization table generation section 58 substitutes the average value of the maximum value MAXM and minimum value MINM of the multiplier M for the multiplier M (M=(MAXM+MINM)/2).

The chrominance component quantization table generation section 60 multiplies quantization levels included in the standard quantization table for chrominance component shown in FIG. 7(B) by a multiplier M to generate a second quantization table for chrominance component for providing a quantization index value equal to the changed quantization index value UQ' input from the quantization index value change section 54 and outputs the second quantization table to the JPEG compression unit 30 similarly to the case of the brightness-component quantization table generation section 58.

The process of the chrominance component quantization table generation section 60 to calculate a multiplier M to multiply with quantization levels in a standard quantization table is described below by referring to FIG. 14. FIG. 14 is a flow chart example showing the process (S42) for calculating a multiplier M to multiply with quantization levels in the standard quantization table for the chrominance component quantization table generation section 60 shown in FIG. 2 to generate a second quantization table for chrominance component. The chrominance component quantization table generation section 60 determines the minimum and maximum values of a multiplier M and calculates a final multiplier M by successively changing values of the multiplier M in accordance with the dichotomy until quantization index values in a standard quantization table obtained by multiplying quantization levels by the multiplier M are equal to the changed quantization index value UQ', similarly to the case in which the brightness-component quantization table generation section 58 generates the second quantization table for luminance component.

As shown in FIG. 14, in step 420, S420), the chrominance component quantization table generation section 60 substitutes the changed quantization index value UQ' for the quantization index value CQ of a quantization table for chrominance component to decide whether the quantization index value CQ is kept in a range of 0 to 100, and it starts the process in S424 when the quantization index value CQ is kept in the range of 0 to 100 but starts the process in S422 unless CQ is kept in the range of 0 to 100. In step 422 (S422), the chrominance component quantization table generation section 60 sets the quantization index value CQ to 0 when the quantization index value CQ is less than 0 and sets the quantization index value CQ to 100 when CQ is 100 or more so that the quantization index value CQ is kept in a correct range. In step 424 (S424), the chrominance component quantization table generation section 60 substitutes 1.0, 255.0, and 0 for a multiplier M and the maximum value MAXM and minimum value MINM of the multiplier M to perform initialization. In step 426 (S426), the chrominance component quantization table generation section 60 changes the quantization table CQ[64] to a quantization table QT (CSQ[64],M) obtained by normalizing values of quantization levels larger than 255 into 255 by multiplying quantization levels in the standard quantization table CSQ[64] shown in FIG. 7(B) by a multiplier M and setting values of quantization levels resulting in less than 1 as a result of the multiplication to 1.

Moreover, the chrominance component quantization table generation section 60 performs the logarithmic-value sum calculation shown in FIG. 11 by assuming a process object as the quantization table CQ[64] (=QT(CSQ[64], M), calculates the sum of logarithmic values in the quantization table CQ[64], and substitutes the sum for the temporary variable QL.

In step 428 (S428), the chrominance component quantization table generation section 60 decides whether the temporary variable QL is equal to the quantization index value CQ (=UQ'), and it multiplies quantization levels in the standard quantization table for chrominance component (FIG. 7(B)) by a multiplier M and outputs the multiplication results to the JPEG compression unit 30 as a second quantization table for chrominance component when the temporary variable QL is equal to the quantization index value CQ but starts the process in S430 unless QL is equal to CQ. In step 430 (S430), the chrominance component quantization table generation section 60 decides whether the temporary variable QL is smaller than the quantization index value CQ, and it starts the process in S432 when the temporary variable QL is smaller than the quantization index value CQ but starts the process in S434 unless QL is smaller than CQ. In step 432 (S432), the chrominance component quantization table generation section 60 substitutes a multiplier M for the minimum value MINM of the multiplier M (MINM=M). In step 434 (S434), the chrominance component quantization table generation section 60 substitutes the multiplier M for the maximum value MAXM of the multiplier M (MAXM=M). In step 436 (S436), the chrominance component quantization table generation section 60 substitutes the average value of the maximum value MAXM and minimum value MINM of the multiplier M for the multiplier M (M=(MAXM+MINM)/2).

The total operation of the image data compression software 5 (image data compression apparatus 1) is as follows. The JPEG expansion unit 40 (FIG. 5) expands the input JPEG data input from the storage unit 22 in accordance with an operation by a user (output JPEG data input from the JPEG compression unit 30) through the JPEG method to generate expanded image data (or confirmation image data), displays the expanded image data on the display unit 20 through the image display IF 18 (FIG. 1), and outputs the data to the JPEG compression unit 30.

In the image data compression software 5, the quantization index value generation section 50 performs the process shown in FIGS. 8 to 11, reflects values of all quantization levels included in a first quantization table, generates quantization index values LQ and CQ to be indexed, and outputs the values LQ and CQ to the quantization index value display section 52 and quantization index value change section 54.

The quantization index value display section 52 displays the single quantization index value UQ generated by the quantization index value generation section 50 on the display unit 20 through the image display IF 18.

The quantization index value change section 54 receives the input of an operation for changing quantization index values performed for the input unit 10 by a user and outputs the received changed quantization index value UQ' to the brightness-component quantization table generation section 58 and chrominance component quantization table generation section 60 of the quantization table generation section 56.

The brightness-component quantization table generation section 58 performs the processes shown in FIG. 13, multiplies quantization levels included in the standard quantization table for luminance component shown in FIG. 7(A) by a multiplier M, generates a second quantization table for luminance component for providing a quantization index value equal to the changed quantization index value UQ' input from the quantization index value change section 54, and outputs the second quantization table to the JPEG compression unit 30.

The chrominance component quantization table generation section 60 performs the processes shown in FIG. 14, multiplies quantization levels included in the standard quantization table for chrominance component shown in FIG. 7(B) by a multiplier M similarly to the case of the brightness-component quantization table generation section 58, generates a second quantization table for chrominance component for providing a quantization index value equal to the changed quantization index value UQ'input from the quantization index value change section 54, and outputs the second quantization table to the JPEG compression unit 30.

The JPEG compression unit 30 compresses the expanded image data input from the JPEG expansion unit 40 by using the second quantization table and outputs the compressed data to the storage unit 22 and JPEG expansion unit 40.

The JPEG expansion unit 40 expands the output JPEG data input from the JPEG compression unit 30 again to generate confirmation image data, displays the confirmation image data on the display unit 20, and provides the image data for a user so that the user can confirm the image quality.

There are many modifications to the embodiments described. As shown in FIGS. 1 and 2, for this embodiment, a case is described in which the JPEG compression unit 30 and JPEG expansion unit 40 are realized in the form of hardware. However, it should be recognized that it is also possible to realize the JPEG compression unit 30 and JPEG expansion unit 40 in the form of software and/or hardware so that the units 30 and 40 serve as a component of the image data compression software 5. Moreover, for the JPEG compression unit 30 (FIG. 2) of the image data compression software 5, a case is described in which DCT and quantization are applied to 8×8-configuration pixel blocks. The configuration of pixel blocks is not restricted to the above case. Furthermore, even if the value of the changed quantization index value UQ' is made larger than the value of the original quantization index value UQ, the image quality is not improved though only the amount of data increases. Therefore, as for the quantization index value change section 54, it is permitted for a user to restrict a range capable of changing quantization index values to a range equal to or less than the original quantization index value UQ. Furthermore, it is permitted that the quantization index value display section 52 directly displays the quantization index values LQ and CQ calculated by the quantization index value generation section 50 through the processes shown in FIGS. 9 and 10 on the display unit 20 and the quantization index value change section 54 receives an operation for changing these two values by a user and substitutes changed quantization index values LQ' and CQ' for the quantization index values LQ and CQ' (sic) shown in an example of processes in FIGS. 13 and 14.

Furthermore, for the quantization index value generation section 50, a case is described in which 2 is used as the base of logarithm. However, it is also possible to use other values as the base of logarithm depending on the purpose.

Furthermore, as described above, it is possible to apply an image data compression apparatus and an image data compression method of the present invention to compression of a still image other than JPEG by properly modifying the apparatus and method. Furthermore, it is possible to apply an image data compression apparatus and an image data compression method of the present invention to not only the compression of a still image but also a case of compressing the compressed image data obtained through a motion picture compression method such as MPEG one frame by one frame while adjusting a quantization table.

As described above, according to an image data compression apparatus and an image data compression method of the present invention, it is possible to know the content of a quantization table used to obtain an image quality and a compression ratio designated to compress and code image data. Moreover, according to an image data compression apparatus and an image data compression method of the present invention, it is possible to compress image data without wastefully increasing the amount of data because a user can easily adjust a quantization table. Furthermore, according to an image data compression apparatus and an image data compression method of the present invention, it is possible to easily adjust quantization levels by obtaining and displaying a single value for indexing many quantization levels included in a quantization table and changing displayed index values by a user.

It is noted that the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

We claim:

1. An image data compression apparatus for compressing image data through a predetermined compression method to generate compressed image data, in which the compression method at least performs compression by using a combination of a plurality of quantization levels (quantization table) and thereby performing quantization and the compressed image data and the quantization table used for generating the compressed image data are correlated to each other, the apparatus comprising:

image data decompression means for expanding first compressed image data generated through the compression method to generate expanded image data;

display means for displaying said expanded image data;

quantization index value generation means for generating a single quantization index value that is calculated by a mathematical function having as inputs the quantization levels included in a first quantization table correlated to the expanded first compressed image data;

quantization index value change means for changing the generated quantization index value to a second index value;

quantization table generation means for setting values of the quantization levels included in the quantization table in accordance with the changed quantization index values to generate a second quantization table having an index equal to said second index value; and image data compression means for compressing the generated expanded image data through the compression method by using the generated second quantization table to generate second compressed image data that is not constrained to fit within a reference storage amount; wherein the compression method applies a predetermined conversion to the image data every pixel block including a plurality of pixels and compressing coefficients obtained as a result of the conversion by using each quantization level included in the quantization table and corresponding to each of the coefficients and thereby quantizing the coefficients, the image data decompression means has de-quantization means for inversely quantizing the pixel blocks included in the first compressed image data by using the first quantization table and inverse conversion means for applying conversion opposite to the predetermined conversion to the inversely quantized pixel blocks to generate the expanded image data, the quantization index value change means changes the generated quantization index values in response to an external input from a user, and the image data compression means has conversion means for applying the predetermined conversion to the pixel blocks included in the generated expanded image data and quantization means for quantizing the converted pixel blocks by using the generated second quantization table to generate the second compressed image data.

2. The image data compression apparatus according to claim 1, wherein the compression method applies discrete cosine transform (DCT) to the image data every pixel block including n×n pixels and compresses n×n DCT coefficients obtained as a result of the DCT by using n×n quantization levels included in the quantization table and corresponding to these DCT coefficients and thereby quantizing the DCT coefficients, in the image data decompression means, the de-quantization means inversely quantizes the n×n quantized DCT coefficients of each of the pixel blocks included in the first compressed image data by using n×n quantization levels included in the first quantization table and corresponding to the DCT coefficients, and the inverse conversion means applies inverse discrete cosine transform (IDCT) to n×n DCT coefficients of each of the inversely-quantized pixel blocks to use the n×n IDCT coefficients obtained as a result of the IDCT as the expanded image data, and in the image data compression means, the conversion means applies DCT to n×n IDCT coefficients of each of the pixel blocks included in the generated expanded image data, and the quantization means quantizes n×n DCT coefficients of each of the discrete-cosine-transformed pixel blocks by using quantization levels included in the second quantization table and corresponding to the DCT coefficients to use the n×n quantized DCT coefficients as the second compressed image data.

3. The image data compression apparatus according to claim 1, wherein the quantization index value generation means weights logarithmic values of quantization levels included in the first quantization table and calculates a value by accumulating the weighted logarithmic values to use the value as the quantization index value, and the quantization table generation means generates the second quantization table by changing the quantization levels included in a prepared standard quantization table or the first quantization table so that a value obtained by weighting and accumulating the logarithmic values of the quantization levels included in the standard quantization table or the first quantization table similarly to the case of calculating the quantization index value becomes equal to the changed quantization index value.

4. An apparatus according to claim 3, in which said means for generating a single quantization index value for indexing values of the n×n quantization levels included in a first quantization table correlated to the expanded first compressed image data comprises means for weighting table elements corresponding to a DC component and a low-frequency component with a first weight and table elements corresponding to a high-frequency component with a second weight less than said first weight, whereby DC and low frequency components influence said index value more than high frequency components do.

5. An image data compression method for compressing image data through the JPEG method to generate compressed image data, in which the JPEG method applies discrete cosine transform (DCT) to an image block constituted of n×n pixels constituting image data and quantizes n×n DCT coefficients obtained as a result of the DCT by using any corresponding one of n×n quantization levels included in a quantization table and the compressed image data and the quantized table used to generate the compressed image data are correlated to each other, the method comprising the steps of:

expanding first compressed image data generated through the JPEG method to generate expanded image data;

generating a single quantization index value for indexing values of the n×n quantization levels included in a first quantization table correlated to the expanded first compressed image data;

displaying the expanded image data and the generated quantization index value and changing the displayed generated quantization index value in accordance with input from a user having had an opportunity to observe said expanded image data;

setting values of the n×n quantization levels included in the quantization table and generating a second quantization table for the quantization index value same as the changed quantization index value; and compressing the generated expanded image data through the JPEG method by using the generated second quantization table to generate second compressed image data.

6. A method according to claim 5, in which said step of generating a single quantization index value for indexing values of the n×n quantization levels included in a first quantization table correlated to the expanded first compressed image data comprises a step of weighting table elements corresponding to a DC component and a low-frequency component with a first weight and table elements corresponding to a high-frequency component with a second weight less than said first weight, whereby DC and low frequency components influence said index value more than high frequency components do.

7. A recording medium storing a program for compressing image data through a predetermined compression method to generate compressed image data, in which the compression method at least performs compression by using a combination of a plurality of quantization levels (quantization table) and thereby performing quantization and the compressed image data and the quantization table used to generate the compressed image data are correlated to each other, in order to make a computer execute:

the image data decompression step of expanding first compressed image data generated through the compression method to generate the expanded image data;

the quantization index value generation step of calculating a quantization index value that is calculated by a mathematical function having as inputs the quantization levels included in a first quantization table correlated to the expanded first compressed image data;

the display step of displaying the expanded image data and the quantization index value;

the quantization index value change step of changing the generated quantization index value to a second index value by a user;

the quantization table generation step of generating second quantization table by setting values of the quantization levels included in the quantization table in accordance with the changed quantization index values to generate a second quantization table having an index equal to said second index value; and the image data compression step of compressing the generated expanded image data through the compression method by using the generated second quantization table to generate second compressed image data that is not constrained to fit within a reference storage amount.

8. The recording medium according to claim 7, wherein the compression method applies a predetermined conversion to the image data every pixel block including a plurality of pixels and compressing coefficients obtained as a result of the conversion by using each quantization level included in the quantization table and corresponding to each of the coefficients and thereby quantizing the coefficients, the image data decompression step includes the de-quantization for inversely quantizing the pixel blocks included in the first compressed image data by using the first quantization table and the inverse conversion for applying the conversion opposite to the predetermined conversion to the inversely-quantized pixel blocks to generate the expanded image data, the quantization index value change step changes the generated quantization index values in accordance with external operations, and the image data compression step includes the conversion for applying the predetermined conversion to the pixel blocks included in the generated expanded image data and the quantization for quantizing the converted pixel blocks by using the generated second quantization table to generate the second compressed image data.

9. The recording medium according to claim 8, wherein the compression method compresses the image data by applying discrete cosine transform (DCT) to the data every pixel block including n×n pixels and quantizing n×n DCT coefficients obtained as a result of the DCT by using n×n quantization levels included in the quantization table and corresponding to the DCT coefficients, in the image data decompression step, the de-quantization inversely quantizes n×n quantized DCT coefficients of each of the pixel blocks included in the first compressed image data by using n×n quantization levels included in the first quantization table and corresponding to the DCT coefficients, the inverse conversion applies inverse discrete cosine transform (IDCT) to n×n DCT coefficients of each of the inversely-quantized pixel blocks and uses the n×n IDCT coefficients obtained as a result of the IDCT as the expanded image data, and in the image data compression step, the conversion applies DCT to the n×n IDCT coefficients of each of the pixel blocks included in the generated expanded image data, and the quantization n×n quantizes DCT coefficients of each of the discrete-cosine-transformed pixel blocks by using quantization levels included in the second quantization table and corresponding to the DCT coefficients and uses n×n quantized DCT coefficients as the second compressed image data.

10. The recording medium according to claim 9, wherein the quantization index value generation step generates the single quantization index value reflecting values of the quantization levels included in the first quantization table, the quantization index value change step changes the generated single quantization index value in accordance with external operations, and the quantization table generation step generates the second quantization table including the quantization levels respectively reflecting the changed single quantization index value.

* * * * *